(12) United States Patent
Cox

(10) Patent No.: US 6,681,909 B2
(45) Date of Patent: Jan. 27, 2004

(54) WALK-BEHIND IMPLEMENT HAVING WRAP SPRING WHEEL CLUTCHES

(75) Inventor: C. Paul Cox, Sellersburg, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/115,362

(22) Filed: Apr. 2, 2002

(65) Prior Publication Data
US 2002/0170797 A1 Nov. 21, 2002

Related U.S. Application Data
(60) Provisional application No. 60/281,162, filed on Apr. 3, 2001.

(51) Int. Cl.⁷ .................. B62D 11/08; F16D 41/02; F16D 43/30
(52) U.S. Cl. .................. 192/26; 180/6.2; 192/48.3; 192/48.92; 192/51; 192/81 C
(58) Field of Search .................. 192/48.92, 49, 192/50, 51, 47, 41 S, 48.3, 48.4, 48.6, 26, 81 C; 180/6.2, 19.1, 19.3

(56) References Cited

U.S. PATENT DOCUMENTS

| | | | |
|---|---|---|---|
| 1,392,936 A | | 10/1921 | Greene |
| 1,421,565 A | | 7/1922 | Reed |
| 2,738,863 A | | 3/1956 | Stelljes |
| 2,780,331 A | | 2/1957 | Armstrong |
| 2,844,965 A | | 7/1958 | Stelljes et al. |
| 2,939,329 A | * | 6/1960 | Doerries .................. 192/51 |
| 2,951,568 A | | 9/1960 | Hungerford, Jr. et al. |
| 3,040,855 A | * | 6/1962 | Chillson .................. 192/50 |
| RE25,229 E | | 8/1962 | Sacchini et al. |
| 3,169,597 A | | 2/1965 | Holloway |
| 3,177,995 A | | 4/1965 | Mason |
| 3,204,478 A | | 9/1965 | Thelin |
| 3,232,369 A | | 2/1966 | Holloway |
| 3,304,793 A | * | 2/1967 | Nishimura .................. 192/51 |
| 3,429,408 A | | 2/1969 | Maker |
| 3,493,088 A | | 2/1970 | Hoff |
| 3,581,853 A | * | 6/1971 | Hoff .................. 192/26 |
| 3,648,810 A | | 3/1972 | Weatherby |
| 3,726,372 A | | 4/1973 | Baer et al. |
| 3,930,566 A | | 1/1976 | Matshushima |
| 4,162,712 A | | 7/1979 | Nelson |
| 4,189,040 A | | 2/1980 | Braunschweig |
| 4,191,283 A | | 3/1980 | Keeny, III |
| 4,321,992 A | | 3/1982 | Gallo |
| 4,418,811 A | | 12/1983 | MacDonald |
| 4,506,900 A | | 3/1985 | Korosue |
| 4,953,369 A | | 9/1990 | Ito |
| 5,018,592 A | | 5/1991 | Buchdrucker |
| 5,022,505 A | | 6/1991 | Io |
| 5,029,689 A | | 7/1991 | Grimm |
| 5,314,053 A | | 5/1994 | Nishimura |
| 5,437,205 A | | 8/1995 | Tseng |
| 5,711,405 A | | 1/1998 | Tamehira |
| 5,718,105 A | | 2/1998 | Irikura et al. |
| 5,752,373 A | | 5/1998 | Cappo et al. |
| 5,771,988 A | | 6/1998 | Kikutani et al. |
| 2002/0148114 A1 | * | 10/2002 | Ruebusch et al. ....... 29/888.01 |

FOREIGN PATENT DOCUMENTS

WO    WO 00/71378    11/2000

* cited by examiner

Primary Examiner—Rodney H. Bonck
(74) Attorney, Agent, or Firm—Baker & Daniels

(57) ABSTRACT

A reversible implement including an engine, an axle driven by the engine, a pair of ground engaging wheels with a wheel located at each axle end, a pair of input hubs rotatably fixed to the axle, a pair of wheel hubs with a wheel hub located at each axle end and attached to a ground engaging wheel, and a wrap spring surrounding a portion of each input hub and each wheel hub. Each wrap spring has a relaxed state, wherein the wrap spring is in one of a first position in which the wrap spring is disengaged from the wheel hub, and the input and wheel hubs are not rotatively coupled and a second position in which the wrap spring is engaged with the wheel hub, and the input and wheel hubs are rotatively coupled, and a contracted state, wherein the wrap spring is in the other position.

18 Claims, 8 Drawing Sheets

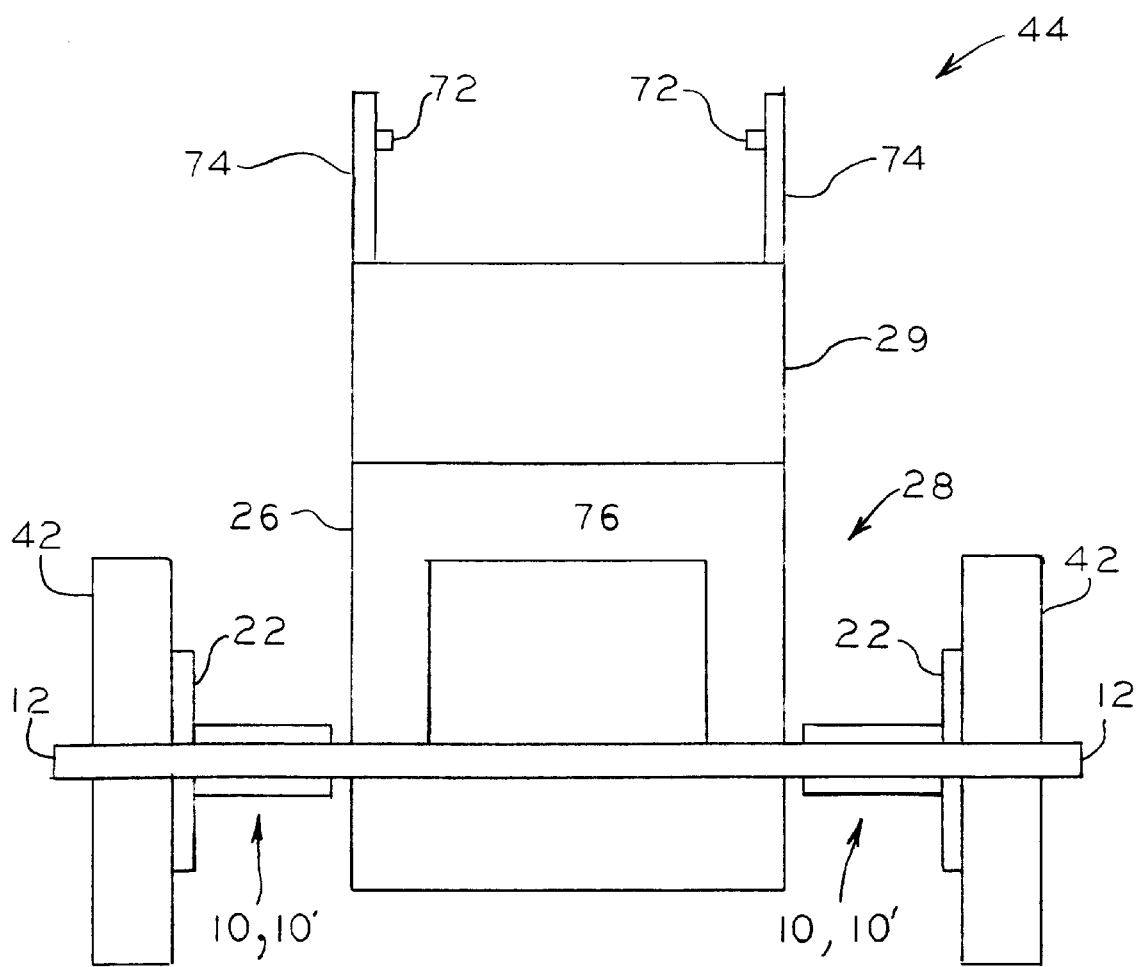
FIG_1C

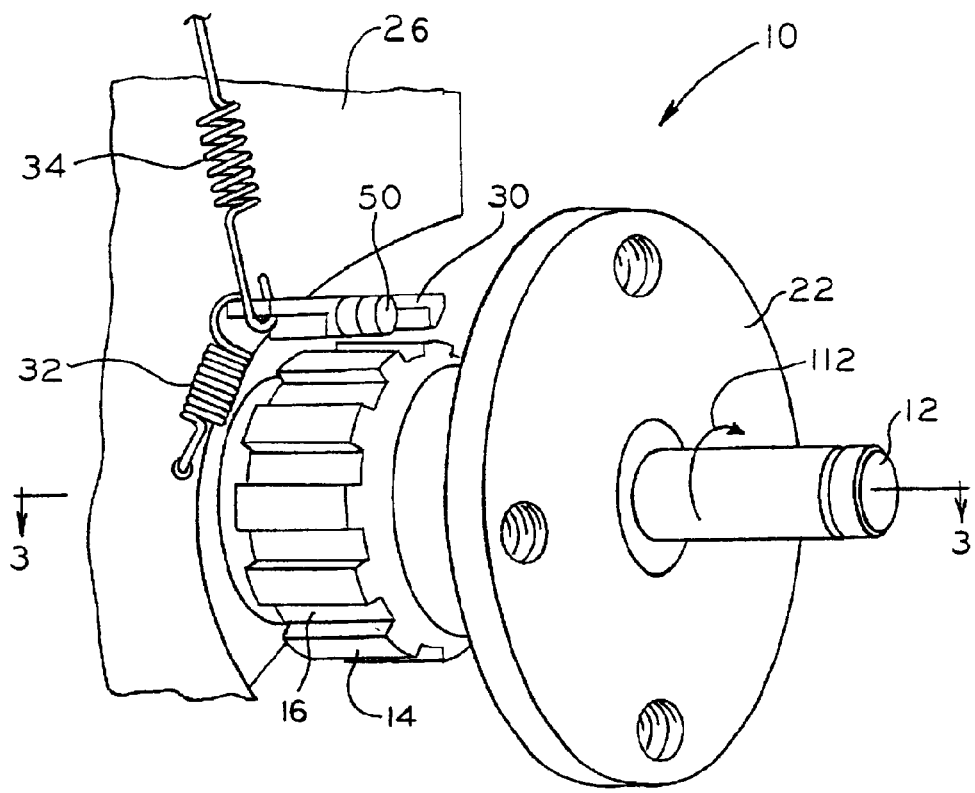
FIG_2
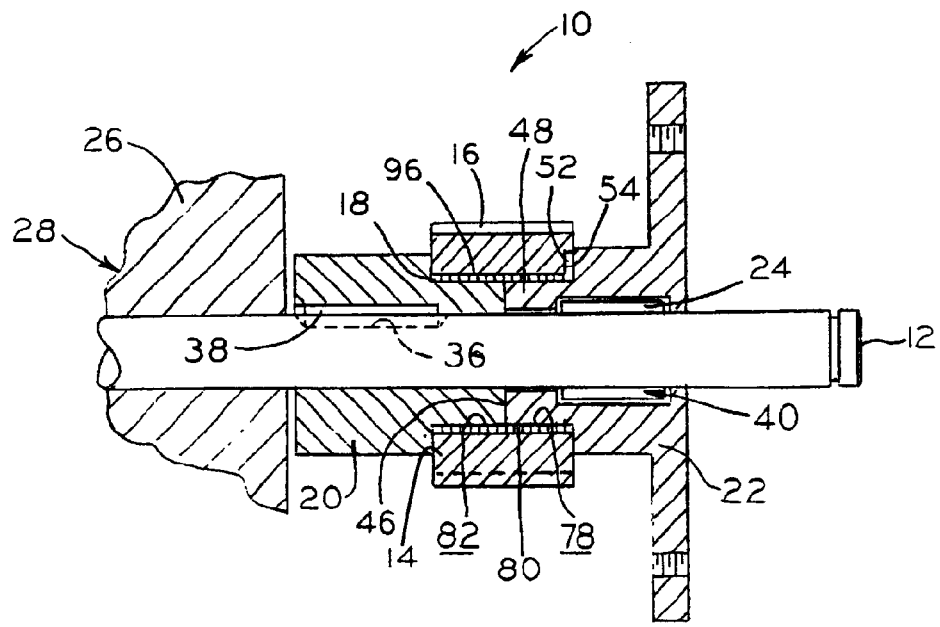
FIG_3

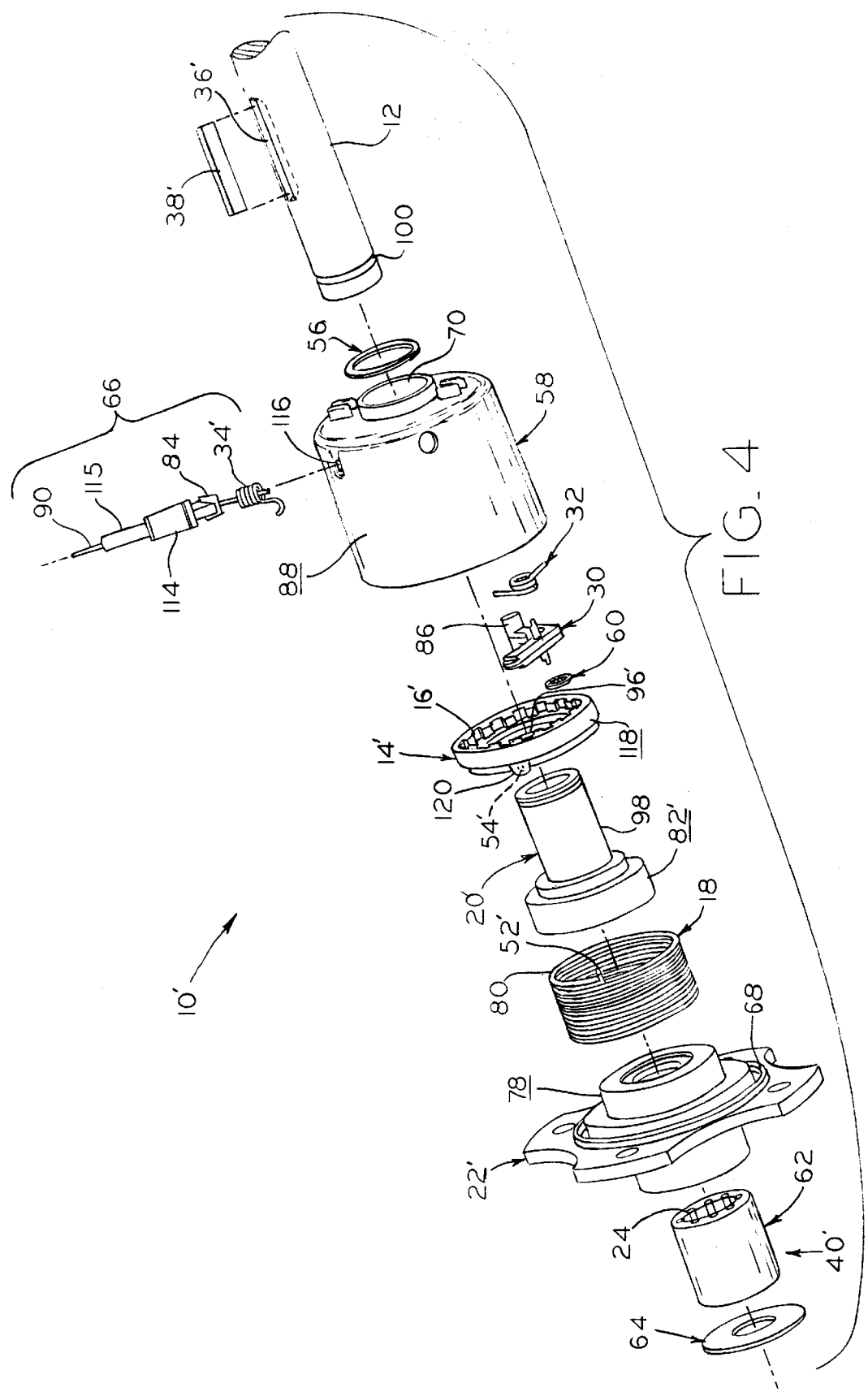

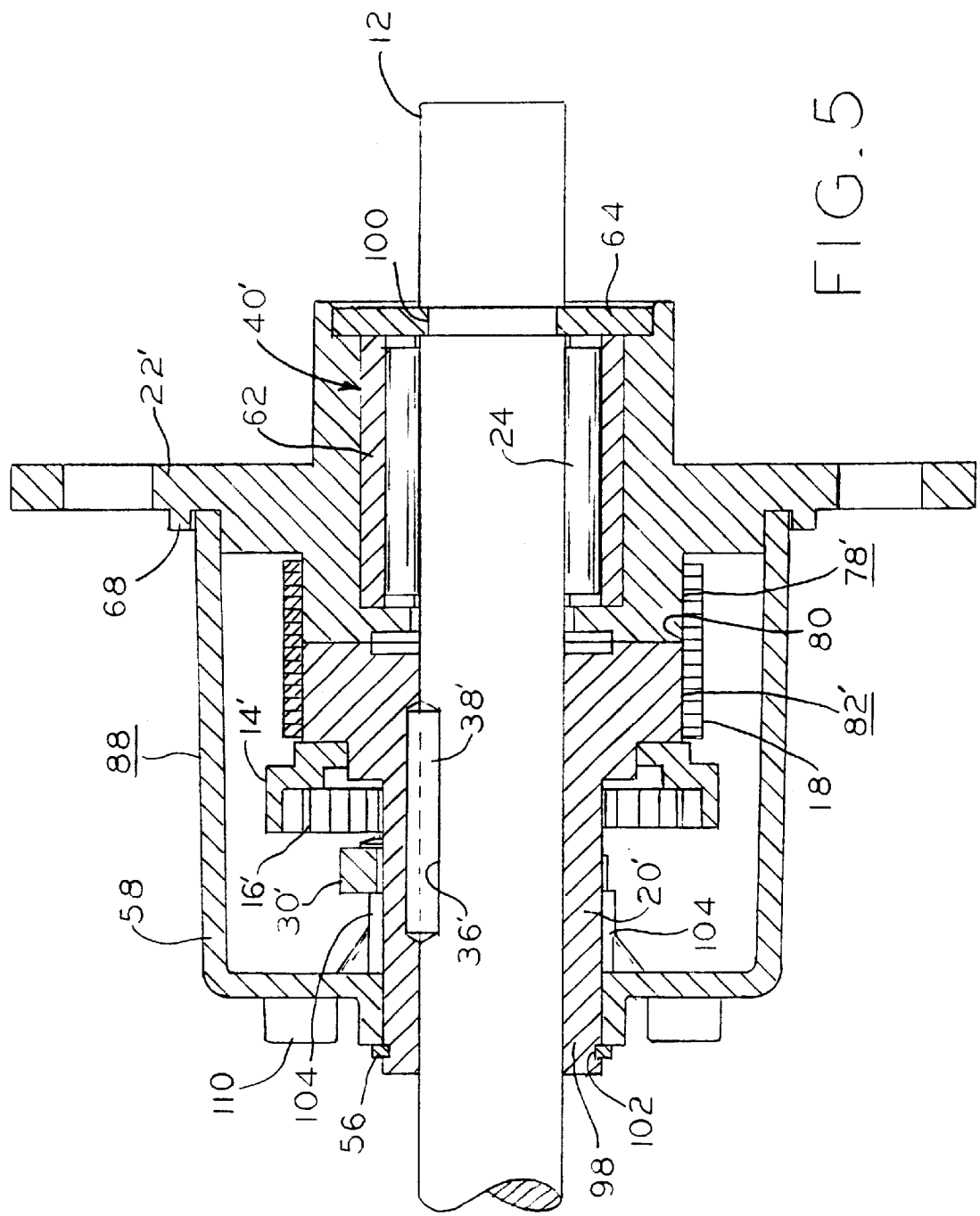

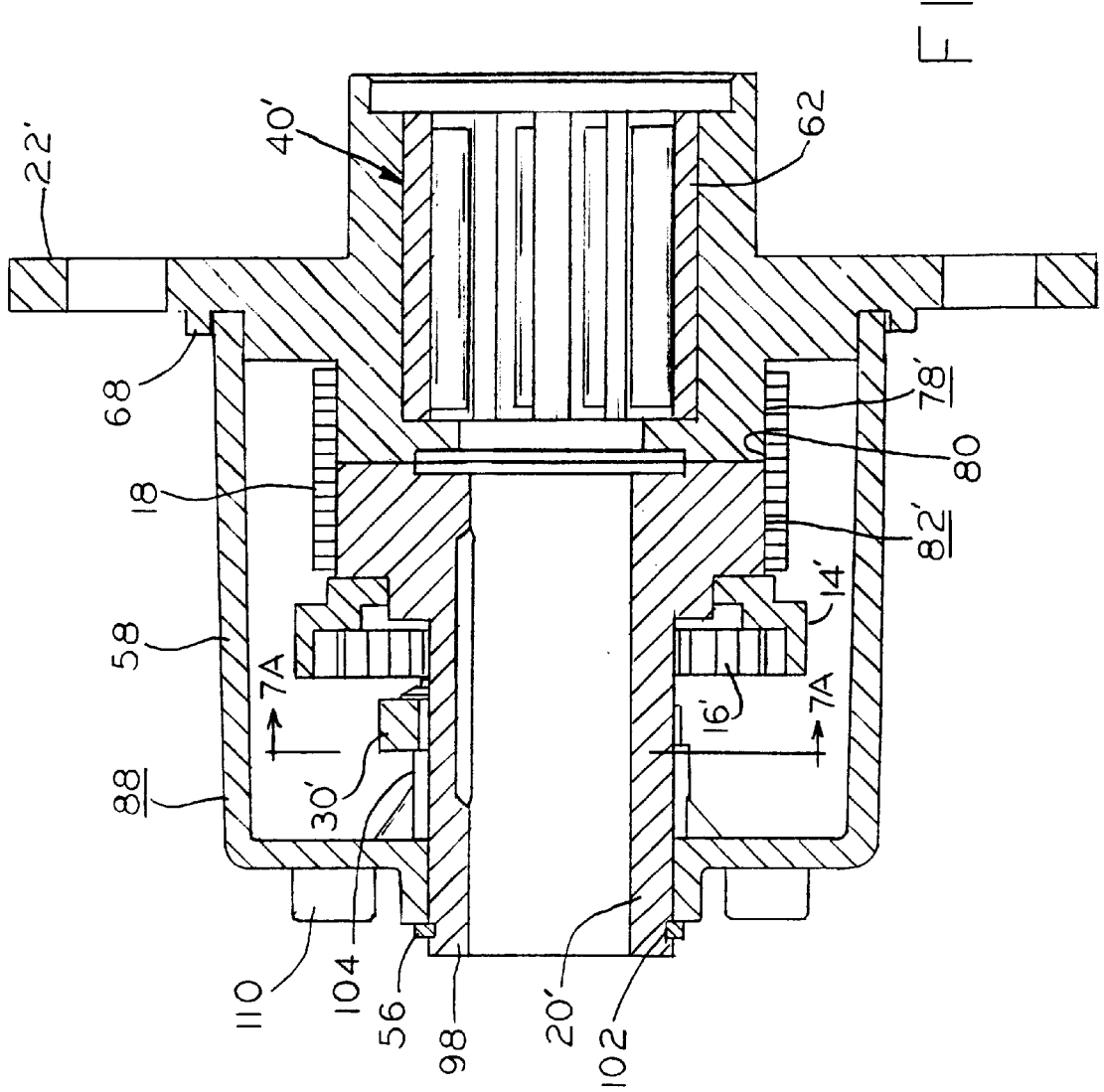

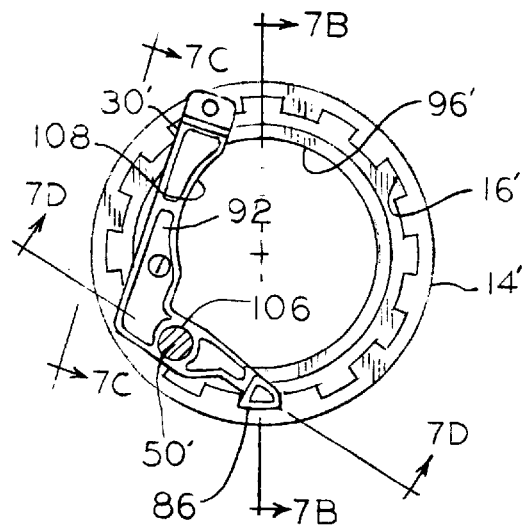
FIG_7A
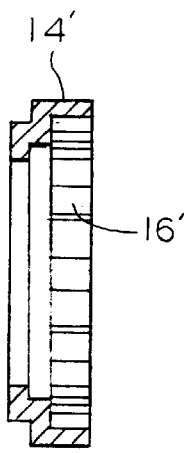
FIG_7B
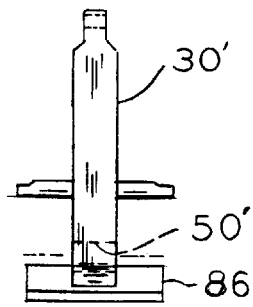
FIG_7C
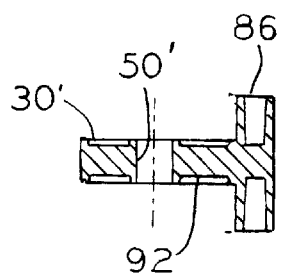
FIG_7D

WALK-BEHIND IMPLEMENT HAVING WRAP SPRING WHEEL CLUTCHES

CROSS-REFERENCE TO RELATED APPLICATION

This application claims the benefit under 35 U.S.C. §119 (e) of U.S. Provisional Application No. 60/281,162, filed Apr. 3, 2001.

BACKGROUND OF THE INVENTION

1. Field of Invention

The present invention relates to clutches for controlling the motion of snow throwers and other walk-behind lawn and garden implements, particularly for steering these implements.

2. Description of the Related Art

Lawn and garden implements, for example, mowers, tillers and snow throwers, often comprise a transaxle through which power from an engine is transmitted to ground-engaging wheels attached to axles extending from the transaxle for propelling the implement. These implements are often difficult to steer, owing to their weight, size or the particular way in which the geartrain of the transaxle is designed. As to their geartrain design, many transaxles are provided with a solid axle which transmits an equal amount of torque to each of the pair of ground-engaging wheels, and during a turn, the wheel at the inside of the turn rotates at the same speed as the wheel at the outside of the turn; the wheel at the inside of the turn must be skidded on the ground to some degree, a considerable degree for sharp turns, in order to negotiate the turn. Controlling the implement can thus be a problem for some operators having insufficient strength or weight to force the implement through the turn as desired.

Previous attempts to address this problem include providing the transaxle with a differential, which allows the two ground-engaging wheels to rotate at different speeds, as is well known in the art. Through use of a differential, the wheel at the inside of the turn is not skidded on the ground during the turn; rather it slows down, while the wheel at the outside of the turn correspondingly speeds up. Differential arrangements, while improving the amount of control during cornering, add considerable cost to the transaxle. Moreover, even if the implement is provided with a differential-equipped transaxle, a not insubstantial amount of force is still required to initiate the turn and hold the implement therethrough. Thus, transaxles having differential arrangements do not provide satisfactorily controllable implements for all operators.

Another possible approach is the use of clutches to control the implement by powering or disengaging power from the ground engaging wheels. Some clutches which provide some control over the powering of an implement or other device include means for selective disengagement of the input and output members (see, e.g., U.S. Pat. Nos. Re. 25,229, 2,951,568, and 3,429,408); other clutches require that the spring expand to produce engagement between the input and output members (see, e.g., U.S. Pat. Nos. 3,040, 855 and 5,029,689); still other clutches use additional elements such as solenoids to cause the contraction of the spring (see, e.g., U.S. Pat. Nos. 3,726,372 and 4,191,283). Currently available clutch mechanisms may also use hand grip-mounted triggers to engage and disengage the clutch. Such systems do provide means for simple engagement and disengagement of the clutches, but do not provide the selective steering capabilities needed for a person of smaller stature to easily control the turning of the implement.

Another alternative has been steering mechanisms which use overrunning clutches at each wheel. These mechanisms disengage power transfer to the inside wheel when the implement is turned. A problem with these systems is that they could prove to be too sensitive when the implement is used on rough ground, such as hilly areas where the implement experiences a turning effect even when the operator travels in a straight line. Another shortcoming of such steering systems is that the overrunning clutches may allow the implement to freewheel on downhill grades as the weight of the implement causes the wheels to turn at a rate faster than the axle, possibly resulting in at least a temporary increase in implement ground speed.

An implement which is easily controlled and steered, even by an operator of small stature or insufficient weight to otherwise easily turn the implement, without great additional expense or complexity, and overcomes the above-described shortcomings of the prior art, would be highly desirable.

SUMMARY OF THE INVENTION

The above-described shortcomings of previous implements are effectively addressed by the present invention, which provides a means for improving implement control and steering as well as providing such control and steering easily and inexpensively.

The present invention provides a reversible implement including an engine, an axle driven by the engine, a pair of ground engaging wheels with one of the wheels being located at each end of the axle, a pair of input hubs with each input hub being rotatably fixed to the axle, a pair of wheel hubs with one of the wheel hubs being located at each end of the axle and attached to one of the ground engaging wheels, and a wrap spring surrounding a portion of each input hub and each wheel hub. Each wrap spring has a relaxed state, wherein the wrap spring is in one of a first position in which the wrap spring is disengaged from the wheel hub, and the input and wheel hubs are not rotatively coupled together, and a second position in which the wrap spring is engaged with the wheel hub, and the input and wheel hubs are rotatively coupled together, and a contracted state, wherein the wrap spring is in the other of the positions.

The present invention further provides an implement including an engine, an axle driven by the engine and having an input hub attached to each end thereof, a pair of ground engaging wheels with one of the wheels being located at each end of the axle and each wheel having a wheel hub attached thereto, a wrap spring disposed around a portion of each input hub and each wheel hub and selectively engaging each wheel hub, and a rotatable control collar surrounding each wrap spring. The control collar has a non-rotating state wherein the wrap spring is disengaged from the wheel hub and a rotating state wherein the wrap spring is in engagement with the wheel hub.

The present invention also provides a reversible implement including an engine, an axle driven by the engine, a pair of ground engaging wheels with one of the wheels being located at each end of the axle, a pair of input hubs with each input hub being rotatably fixed to the axle, a pair of wheel hubs with one of the wheel hubs being located at each end of the axle and attached to one of the ground engaging wheels, a wrap spring surrounding a portion of each input hub and each wheel hub, and a rotatable control collar surrounding each wrap spring. Each wrap spring has a relaxed state, wherein the wrap spring is in one of a first position in which the wrap spring is disengaged from the wheel hub, and the input and wheel hubs are not rotatively coupled together, and a second position in which the wrap spring is engaged with the wheel hub, and the input and wheel hubs are rotatively coupled together, and a contracted state, wherein the wrap spring is in the other of the positions. The rotatable control collar is movable between a non-rotating state wherein the wrap spring is in its relaxed state and a rotating state wherein the wrap spring is urged into its contracted state.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1C is a schematic view of an implement according to the present invention;

FIG. 2 is a fragmentary, perspective view of a walk-behind implement having a first embodiment of a wrap spring wheel clutch according to the present invention, with the associated wheel removed;

FIG. 3 is a sectional view of the wrap spring wheel clutch of FIG. 2 along line 3—3;

FIG. 4 is an exploded view of a second embodiment of a wheel clutch according to the present invention;

FIG. 5 is a sectional view of the assembled wheel clutch of FIG. 4 including an axle;

FIG. 6 is a sectional view of the assembled wheel clutch of FIG. 4 without an axle;

FIG. 7A is a sectional view of the control collar and pawl portion of the second embodiment wheel clutch of FIGS. 4 and 6 along line 7A—7A of FIG. 6, excluding the input hub of the wheel clutch;

FIG. 7B is a sectional view of the control collar of FIG. 7A along line 7B—7B;

FIG. 7C is an end view of the pawl of FIG. 7A;

FIG. 7D is a sectional view of the pawl of FIG. 7C along line 7D—7D;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1A:
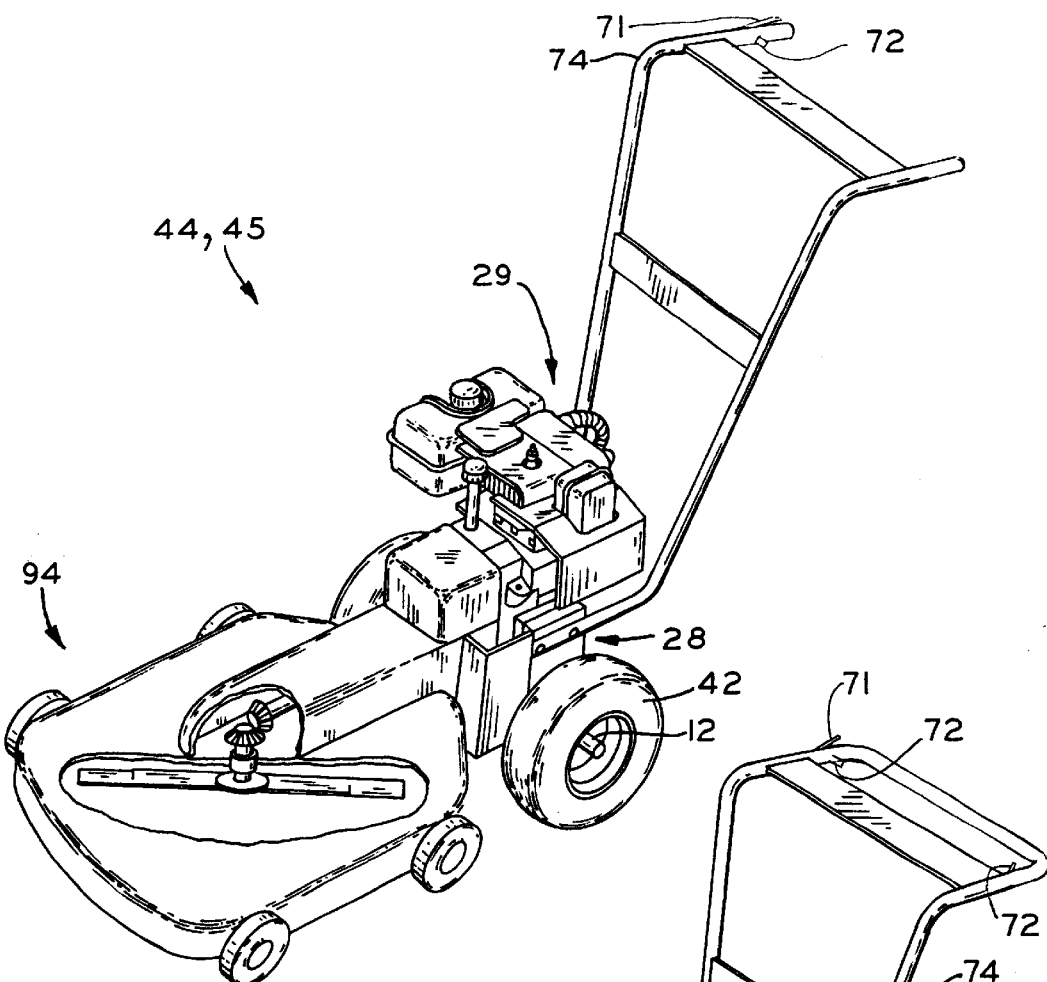
FIG. 1A is a perspective view of a first embodiment of an implement which includes the inventive clutch mechanism, and the implement is shown as a lawnmower.

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 1B:
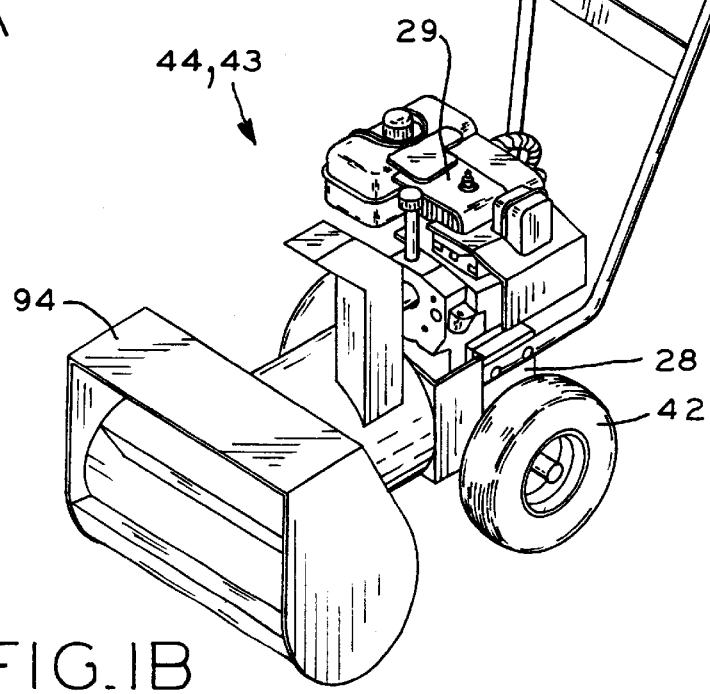
FIG. 1B is a perspective view of a second embodiment of an implement which includes the inventive clutch mechanism, and the implement is shown as a snow thrower.

Implement 44 is shown in FIGS. 1A and 1B, and schematically in FIG. 1C, and is representatively shown as lawnmower 45 (FIG. 1A) and snow thrower 43 (FIG. 1B), similar to that disclosed in U.S. patent application Ser. No. 09/785,431, filed Feb. 16, 2001, the disclosure of which is expressly incorporated herein by reference. As shown in FIGS. 1A–1C, implement 44 includes engine 29, frame 28 attached to engine 29 and enclosing a transmission means, working device 94, handle 74, and wheels 42. Implement 44 also includes a steering mechanism by which the operator may easily control turning of the implement.

As shown schematically in FIG. 1C, solid axle 12 is operatively connected to, or a component of, transmission 76. Transmission 76 may be of any type of transmission or transaxle which may be located in frame 28 or casing 26, such as the known type and basic design exemplified by commercially available 1300, 2500 or 2600 Series transaxles manufactured by Tecumseh Products Company. Transmission 76 may instead include a friction disk arrangement or gear reduction mechanism to provide power to solid axle 12, which is engaged to wheels 42 through clutch mechanism 10 and wheel hubs 22.

It should be noted that handles 74 may include a single grip structure for grasping, as shown in FIG. 1B, or consist of two separate grip portions for grasping, as shown in FIGS. 1A and 1C. Either structure is suitable for including triggers 72. Handles 74 also include lever 71 used to facilitate rotation of axle 12 through engagement of a primary drive mechanism (not shown) when lever 71 is activated. Lever 71 and triggers 72 are concurrently operated to provide forward motion of implement 44. The operation of triggers 72 in relation to steering implement 44 will be described in further detail herein below.

Referring to FIGS. 2 and 3, first embodiment clutch mechanism 10 is shown. As shown in FIG. 1C, one clutch mechanism 10 is provided at each end of axle 12, adjacent frame 28. Referring now to FIG. 3, within each clutch mechanism 10 is axle 12. Each end of axle 12 is provided with input hub 20 keyed thereto, through key 38 being received in keyway 36 in axle 12; when axle 12 rotates, both of input hubs 20 also rotate. The ends of axle 12 also extend through wheel hubs 22.

Axle 12 and each wheel hub 22 interface through one-way clutch 40 comprising a plurality of circumferentially arranged roller bearings 24. One way clutch 40 may be the Wheel Clutch product available from the Motion Control Division of Hilliard Corporation of Elmira, N.Y. Should transmission 76 be reversible, one way clutches 40 lockingly engage axle 12, i.e., axle 12 directly engages wheel hubs 22 through one way clutches 40, when reversely rotated, thus both wheels 42 (FIG. 1C) are driven to reverse implement 44. Axle 12 may freely rotate in the forward direction relative to wheel hub 22, as designated by arrow 112, within roller bearings 24.

Referring to FIG. 3, input hub 20 is axially adjacent wheel hub 22, and both input hub 20 and wheel hub 22 have a reduced diameter portion 46 and 48, respectively, about which is disposed wrap spring 18. Wrap spring 18 overlies both portions 46 and 48 and, when in its contracted state, is wrapped tightly around surfaces 82 and 78 of reduced portions 46 and 48 and has frictional contact between inner surface 80 of spring 18 and surfaces 82 and 78. Even in its relaxed state, spring 18 still has a slight amount of frictional contact between inner surface 80, surface 82 of reduced diameter portion 46, and surface 78 of reduced diameter portion 48 since the inner diameter of spring 18 is sized slightly smaller than the outer diameter of wheel hub 22 and input hub 20. However, this slight amount of frictional contact is not enough for clutched engagement of input hub 20 and wheel hub 22, rather, spring 18 contracts and wraps tightly around the respective hubs for clutched engagement. It is to be noted that by having such a slight amount of frictional contact, contraction of spring 18, as further described hereinbelow, is more easily achieved to bring wheel hub 22 and input hub 20 together in clutching engagement. Additionally, coils of wrap springs 18 have a rectangular cross section to provide more surface area for contact with portions 46 and 48 and to allow for a higher torque capacity when spring 18 contracts.

Disposed about the outer surface of spring 18 is control collar 14. The end of spring 18 nearest wheel hub 22 projects radially outward to form control tang 52 which is received into recess 54 provided in inner circumferential surface 96 of control collar 14. Thus, the end of wrap spring 18, at which control tang 52 is located, and control collar 14 are rotatably fixed to each other.

Referring to FIGS. 2 and 3, the outer circumferential surface of control collar 14 is provided with a plurality of axially extending slots 16 located in its outer circumferential surface. Pawl 30 is pivotally attached to frame 28 of implement 44 by pivot pin 50, and is biased by spring 32 into engagement with one of slots 16 in control collar 14, preventing rotation of control collar 14 in the forward direction. As such, spring 18 remains in its relaxed state and in slight contact with input hub 20 and wheel hub 22, as described above.

Trigger 72 (FIGS. 1A through 1C) is provided near each handgrip of handle 74 (FIGS. 1A through 1C), and when held down, disengages pawl 30, connected to trigger 72 via cable 90, from control collar 14 of the corresponding wheel 42. Such disengagement of pawl 30 allows input hub 20 of the corresponding wheel 42 to rotate in the forward direction. As input hub 20 is allowed to rotate, wrap spring 18 also begins to rotate, due to the drag created by the surface contact between inner surface 80 and surfaces 82 and 78, and contracts as a result. As spring 18 contracts, it wraps itself tightly around reduced portions 46 and 48, thereby bringing input hub 20 and wheel hub 22 of the selected wheel 42 into clutched engagement through wrap spring 18.

Wrap spring 18 will contract when control collar 14 is allowed to rotate since wrap spring 18 is fixed to control collar 14 through tang 52 and rotates with input hub 20. Control collar 14 rotates in turn causing the coils of wrap spring 18 to also rotate, resulting in the clutched engagement, as described above. When control collar 14 is not rotating, the coils of wrap spring 18 are not rotating, thus wrap spring 18 is not in the process of contracting, thereby preventing clutched engagement.

By selectively releasing one of triggers 72, control collar 14, on the side on which trigger 72 was released, is prevented from rotating, thus wrap spring 18 is also prevented from rotating, thereby preventing contraction of its diameter due to being rotatably fixed to control collar 14, as described above. Because wrap spring 18 is prevented from contracting in diameter, reduced portions 46 and 48, or hubs 20 and 22, are not brought together and no torque is transferred from the forwardly rotating input hub 20 to wheel hub 22 or to the corresponding wheel 42. By releasing one of the triggers 72, the implement 44 may be steered in the direction of the side on which trigger 72 is pulled by implement 44 being powered through the turn by the opposite wheel 42.

It should be noted that pawl 30 only prevents rotation in the forward direction since pawl 30 has a ramp structure at its control collar engaging end. Such a structure causes pawl 30 to remain firmly engaged in one of slots 16 when control collar 14 is attempting to rotate in the forward direction, but allows pawl 30 to disengage a slot 16 and to slide over control collar 14 when control collar 14 is rotating in a reverse direction and the associated trigger 72 is released. Pawl 30 will oscillate about pivot pin 50 as pawl 30 slides into and out of slots 16 as control collar 14 rotates in a reverse direction.

Referring to FIGS. 4, 5, and 6, a second embodiment of the inventive clutch mechanism is shown and is designated as clutch mechanism 10'. Corresponding elements in the second embodiment have been given corresponding numbers as the first embodiment with the addition of a prime designation. The second embodiment includes wheel hub 22', wrap spring 18, input hub 20' keyed to axle 12 through key 38' and keyway 36', control collar 14', pawl 30', and biasing spring 32, all of which have the same functions as the corresponding elements in the first embodiment.

Cover 58, made of injection molded plastic, overlies spring 18, input hub 20', control collar 14', flat washer 60 between collar 14' and pawl 30', pawl 30', and spring 32. Cover 58 is slidably engaged with wheel hub 22' at lip 68; wheel hub 22' is allowed to rotate relative to stationary cover 58. Cover 58 also has tabs 110 molded thereon to prevent rotation of cover 58 when clutch mechanism 10' is placed on implement 44 and is used by the operator. Tabs 110 include a pair of adjacent protrusions which receive a corresponding protrusion from frame 28, thereby locking cover 58 to frame 28 and preventing rotation of cover 58.

A reduced diameter extension 98 of input hub 20' extends through opening 70 in cover 58 with retaining ring 56 being disposed in groove 102 about reduced diameter extension 98. Wheel hub 22' receives extension 62, which includes a plurality of roller bearings 24 to create one way clutch 40'. One way clutch 40' may be the Wheel Clutch product available from the Motion Control Division of Hilliard Corporation of Elmira, N.Y. Spring 18 has inner circumferential surface 80 which interfaces with surface 82' of input hub 20' and surface 78' of wheel hub 22'; however, surfaces 82' and 78' do not have a reduced diameter, unlike the counterpart surfaces 82 and 78 of the first clutch embodiment.

Clutch mechanism 10' further includes a Bowden cable assembly 66 having shielded cable 90 connected to trigger 72 (FIG. 1) on handles 74 (FIG. 1) of implement 44 to provide an actuation mechanism which operates in a manner similar to that described above. Cable assembly 66 also includes spring 34' corresponding to spring 34 and injection-molded plastic "bullet" 114 fixed to cable sheath 115 and having tabs 84 which expand into engagement with surface 88 of cover 58. Cable assembly 66 is inserted into a hole 116 with spring 34' being retained within cover 58, tabs 84 in engagement with surface 88, and bullet 114 and cable 90 remaining external of cover 58. When clutch mechanism 10' is assembled and attached to implement 44, retaining ring 64 is maintained in wheel hub 22' and is disposed about axle 12 in groove 100 to prevent clutch mechanism 10' from moving axial outward.

With reference to FIG. 7A, control collar 14' of the second embodiment clutch mechanism 10' is provided with axially extending slots 16' which are located in inner circumferential surface 96' of control collar 14' (FIG. 7B). Control collar 14', similar to control collar 14, receives tang 52' (FIG. 4) of spring 18 within recess 54' in protuberance 120 on exterior surface 118 of control collar 14'. By utilizing tang 52' and recess 54', spring 18 and control collar 14' are fixed and may operate in a manner similar to spring 18 and control collar 14, described above.

Figure 8:
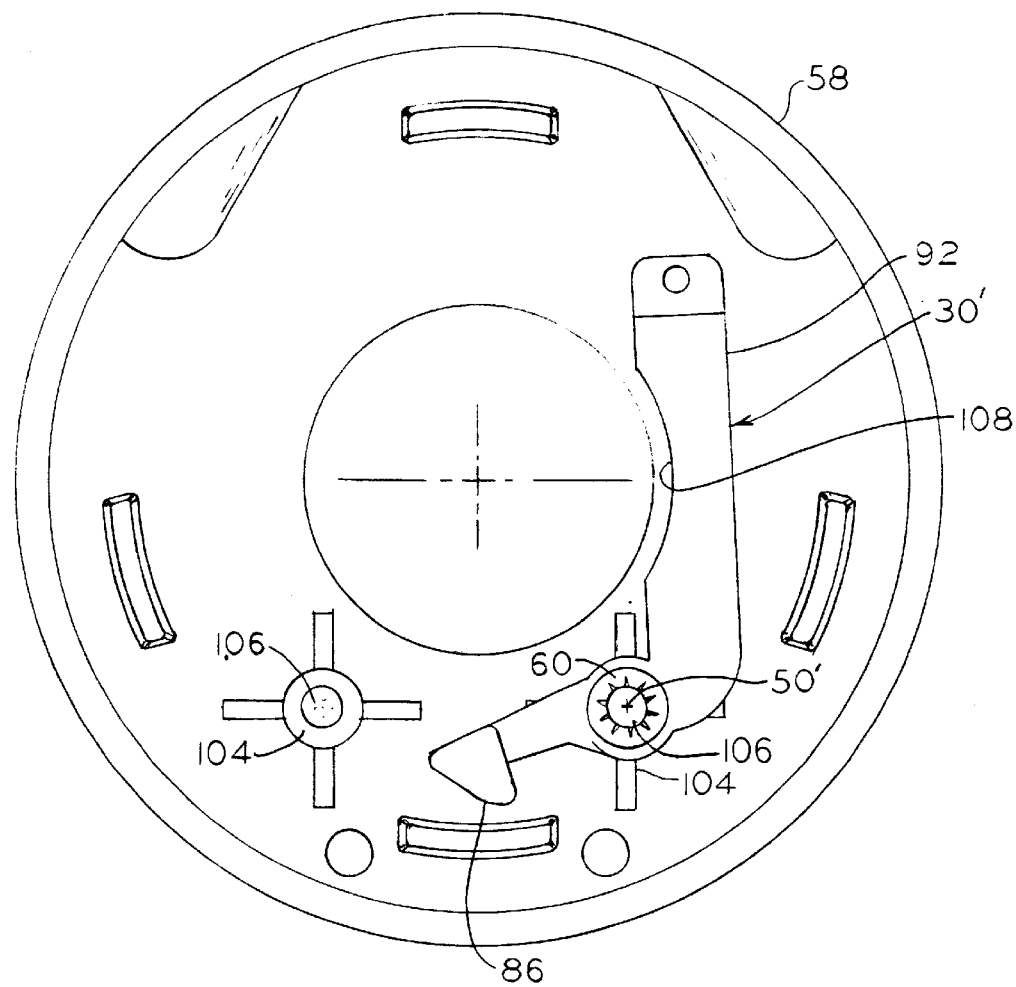
FIG. 8 is a plan view of the inside of the cover of the second clutch embodiment including the pawl of FIG. 7A.
Figure 9:
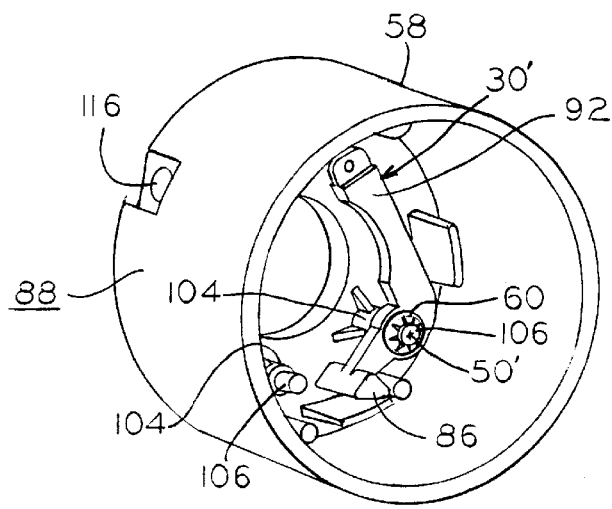
FIG. 9 is a perspective view of the cover of FIG. 8.

Pawl 30', also maintained within cover 58, is seated in such a manner that its pivot point, or aperture 50, is located within inner circumferential surface 96' of control collar 14'. Pawl 30' has a T-shaped structure, as shown in FIGS. 7C and 7D, with head portion 86 and a substantially L-shaped portion 92 which is at a right angle to head portion 86 is axially adjacent to collar 14', with one end of head portion 86 engaging one of slots 16', through the biasing action of spring 32, as shown in FIGS. 8 and 9. Pawl 30' may be disengaged from slots 16' in a manner similar to that of pawl 30 of the first embodiment, described above.

Referring to FIGS. 8 and 9, pawl 30' is shown within cover 58. As seen, pawl 30' is situated on post 104. Unlike the first embodiment, the pivot point on pawl 30' is aperture 50' that receives reduced portion 106 of post 104. Such receipt allows pawl 30' to be rotated to a limited degree about post 104 and engage slots 16' in control collar 14'. It should be noted that pawl 30' includes curved surface 108 in portion 92 to allow pawl 30' to rotate without contacting input hub 20'.

Both clutch mechanism 10 and clutch mechanism 10' are capable of being used on the right or left-hand sides of implement frame 28. Wheel hubs 22, 22' and input hubs 20, 20' are easily manipulated for use at either end of axle 12, as are all other parts. Although other parts require little, if any, modification for the different orientations, cover 58 of clutch mechanism 10' is provided with a duality of holes 116 for insertion of cable assembly 66 and two posts 104 for receipt of pawl 30'. The particular hole 116 or post 104 that will be used is based upon whether a clutch mechanism 10, 10' has been selected for use on the right or left side of the implement.

While this invention has been described as having exemplary structures, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A reversible implement comprising:
   an engine;
   an axle driven by said engine;
   a pair of ground engaging wheels, one of said wheels being located at each end of said axle;
   a pair of input hubs, each said input hub being rotatably fixed to said axle;
   a pair of wheel hubs, one of said wheel hubs being located at each end of said axle and attached to one of said ground engaging wheels; and
   a wrap spring surrounding a portion of each said input hub and each said wheel hub, each said wrap spring having a relaxed state wherein said wrap is disengaged from said wheel hub and said input and wheel hubs are not rotatively coupled together, and a contracted state wherein said wrap spring is engaged with said wheel hub and said input and wheel hubs are rotatively coupled together.

2. The implement of claim 1, wherein each said wheel hub further includes a plurality of one-way roller bearings, said axle directly engaging said wheel hubs through said plurality of one-way roller bearings when said axle is reversely rotated.

3. The implement of claim 2, wherein said axle freely rotates within said one-way roller bearings when said axle is rotated in a forward direction.

4. The implement of claim 1, wherein when said spring is in its said relaxed state, said axle and said wheel are not in forward rotational engagement and when said wrap spring is in its said contracted state, said axle and said wheel are in forward rotational engagement.

5. An implement comprising:
   an engine;
   an axle driven by said engine, said axle having an input hub attached to each end thereof;
   a pair of ground engaging wheels, one of said wheels being located at each end of said axle, each said wheel having a wheel hub attached thereto;
   a wrap spring disposed around a portion of each said input hub and each said wheel hub, said wrap spring selectively engaging each said wheel hub when contracted; and
   a rotatable control collar surrounding each said wrap spring, said control collar having a non-rotating state wherein said wrap spring is disengaged from said wheel hub and a rotating state wherein said wrap spring is in engagement with said wheel hub.

6. The implement of claim 5, wherein when said wrap spring is engaged with said wheel hub, said axle and said wheel are in forward rotational engagement, and when said wrap spring is disengaged from said wheel hub, said axle and said wheel are not in forward rotational engagement.

7. The implement of claim 5, wherein said implement is reversible and said wheel hub further includes a plurality of one-way roller bearings within said wheel hub, said axle directly engaging said wheel hubs through said plurality of one-way roller bearings when said axle is reversely rotated.

8. The implement of claim 5, wherein said implement further comprises:
   a pawl selectively engageable with said control collar;
   an actuation mechanism connected to each said pawl; and
   a handle having a pair of user operated trigger devices, each said trigger device being operatively connected to a said actuation mechanism.

9. The implement of claim 8, wherein each said actuation mechanism comprises a cable.

10. The implement of claim 8, wherein upon engagement of said pawl and said control collar, said control collar is in its said non-rotating state and said axle is not in forward rotational engagement with said wheel, and upon disengagement of said pawl and said control collar, said control collar is in its said rotating state and said axle and said wheel are in forward rotational engagement.

11. A reversible implement comprising:
   an engine;
   an axle driven by said engine;
   a pair of ground engaging wheels, one of said wheels being located at each end of said axle;
   a pair of input hubs, each said input hub being rotatably fixed to said axle;
   a pair of wheel hubs, one of said wheel hubs being located at each end of said axle and attached to one of said ground engaging wheels; and
   a wrap spring surrounding a portion of each said input hub and each said wheel hub, each said wrap spring having a relaxed state wherein said wrap spring is disengaged from said wheel hub and said input and wheel hubs are not rotatively coupled together, and a contracted state wherein said wrap spring is engaged with said wheel hub and said input and wheel hubs are rotatively coupled together; and a rotatable control collar surrounding each said wrap spring, said control collar being movable between a non-rotating state wherein said wrap spring is in its said relaxed state and a rotating state wherein said wrap spring is urged into its said contracted state.

12. The implement of claim 11, wherein said implement further comprises:

a pawl selectively engageable with said control collar;

an actuation mechanism connected to each said pawl; and a handle having a pair of user operated trigger devices, each said trigger device being operatively connected to a said actuation mechanism.

13. The implement of claim 12, wherein each said actuation mechanism comprises a cable.

14. The implement of claim 12, wherein said triggers are operated individually.

15. The implement of claim 12, wherein upon engagement of said pawl and said control collar, said control collar is in its said non-rotating state and said axle is not in forward rotational engagement with said wheel, and upon disengagement of said pawl and said control collar, said control collar is in its said rotating state and said axle is in forward rotational engagement with said wheel.

16. The implement of claim 11, wherein each said wheel hub further includes a plurality of one-way roller bearings, said axle directly engaging said wheel hubs through said plurality of one-way roller bearings when said axle is reversely rotated.

17. The implement of claim 16, wherein said axle freely rotates within said plurality of bearings when rotated in a forward direction.

18. The implement of claim 11, wherein when said wrap spring is in its relaxed state, said axle and said wheel are not in forward rotational engagement, and when said wrap spring is in its said contracted state, said axle and said wheel are in forward rotational engagement.

* * * * *